United States Patent [19]

Motegi et al.

[11] 4,234,532
[45] Nov. 18, 1980

[54] METHOD OF MANUFACTURING POLYESTER FILMS

[75] Inventors: Masahiko Motegi, Hikone; Ikukazu Kimata, Shiga; Saburo Fujita, Otsu, all of Japan

[73] Assignee: Toray Industries, Inc., Tokyo, Japan

[21] Appl. No.: 66,451

[22] Filed: Aug. 14, 1979

[30] Foreign Application Priority Data

Aug. 15, 1978 [JP] Japan .................................. 53-99387

[51] Int. Cl.³ .................... B29C 17/02; B29C 25/00
[52] U.S. Cl. ................................................. 264/235.8
[58] Field of Search ............... 264/235.8, 210.2, 210.7, 264/342 RE, 346

[56] References Cited

U.S. PATENT DOCUMENTS

| | | | |
|---|---|---|---|
| 2,884,663 | 5/1959 | Allet | 264/235.8 |
| 3,461,199 | 8/1969 | Campbell | 264/235.8 |
| 4,042,569 | 8/1977 | Bell et al. | 264/235.8 |

*Primary Examiner*—James B. Lowe
*Attorney, Agent, or Firm*—Miller & Prestia

[57] ABSTRACT

The present invention relates to a process for preparing a highly tensilized polyester film that has enhanced mechanical properties in both longitudinal and transverse directions. The process involves the simultaneous machine and transverse direction stretching and subsequent heat setting of a film that has already been highly stretched in the machine and transverse directions individually. During the simultaneous stretching process both the temperature and rate of linear movement of the film are controlled.

26 Claims, No Drawings

4,234,532

METHOD OF MANUFACTURING POLYESTER FILMS

BRIEF DESCRIPTION OF THIS INVENTION

This invention relates to a process for preparing highly tensilized polyester film. More particularly, the invention relates to a process for preparation of polyester film having enhanced mechanical properties not only uniaxially but also biaxially.

DISCUSSION OF THE ART

Biaxially oriented films of polyester such as polyethylene terephthalate (PET) possess many desirable characteristics such as good thermostability, dimensional stability and mechanical properties that should make it an outstanding candidate for use as a base film in magnetic recording tapes, capacitors, and so on. The better the mechanical properties of the base film are, the thinner the film that can be used, thus allowing miniaturization of hardware for magnetic tape decks, capacitors, and so on. In the alternative, if the size of the hardware is not changed, the use of the new tapes allows existing hardware to have substantially increased capacity.

Up to now, a longitudinally tensilized polyester film has been used as a thin base film. For preparation of such a film, a process which includes the step of post-stretching the film in MD, which has been biaxially stretched, is usually applied.

But this longitudinally tensilized polyester film has an undesirable roll-formation property since it is apt to allow creases to form in MD on winding.

At the present time, there is an increased demand for thinner film due to the development and spread of information technology. But in this market, ordinary longitudinally tensilized thin film does not give the desired results. It is believed that thin film must have higher mechanical strength in both MD and TD. Generally speaking, ordinary biaxially stretched polyester film has a tensile strength at 5% elongation (F-5 value) in both MD and TD in the range of 10 to 11 kg/mm². A longitudinally tensilized film has desirable properties in MD but a poor F-5 value in TD, e.g., in the range of 9 to 11 kg/mm². So, in the case of ordinary thin film, it cannot be used satisfactorily under many conditions.

Toray Industries, Inc., the assignor of this invention, has already proposed a process for preparation of a biaxially tensilized polyester film by post-stretching a biaxially stretched film in order of MD and in TD in Japanese Patent Application No. 39808/74. But in the case of a usual process, which uses rolls on longitudinal post-stretching, there is a problem of film shrinkage or neck-down in TD.

RELATED APPLICATION

Reference is made to the co-pending application, Ser. No. 64,375, filed Aug. 7, 1979.

DETAILED DESCRIPTION OF THIS INVENTION

It is an object of this invention to provide an effective process for preparation of a biaxially tensilized polyester film with few breaks on stretching, and to provide a film product having good stretchability. The present invention provides a process for preparation of a tensilized polyester film having F-5 values over 14 kg/mm² in both MD and TD, from a film that has been stretched to an extent of at least 2.6 times its original dimensions in MD and TD respectively. This is surprisingly accomplished by simultaneously stretching the film in the range of 1.05 to 1.9 times its dimensions in MD and 1.0 to 1.9 times its dimensions in TD at a linear rate of stretch speed under 8,000 percent per minute at a temperature between $T_g$ (the glass transition temperature of the polyester)+10° C. and $T_m$ (the melting point of the polyester)−40° C. and finally heat-setting said film at a temperature between $T_g+50°$ C. and $T_m-10°$ C. In order to stretch a film effectively while at the same time controlling breakage and loss of biaxial strength originating during relaxation of orientation in MD and TD on stretching, it is important to adopt simultaneous post-stretching under 1.9 times the films's dimensions as the final stretch process. The film of the invention has excellent F-5 values, over 14 kg/mm² in MD and TD; these high F-5 values contribute to good roll formation of the film, good processability in magnetic recording tapes and capacitors, and a good running property when the film is used for magnetic recording tapes. Since the F-5 value is preferably over 15.5 kg/mm², more preferably over 18.0 kg/mm² in both MD and TD, the film of the instant invention is superior to ordinary films when it comes to properties dependent on high F-5 values.

Such high F-5 values can be achieved by simultaneously stretching the biaxially oriented film under carefully controlled conditions. The product of the stretch ratio in MD (A) of a biaxially stretched film and a sumultaneously post-stretched ratio in MD (A') and the product of the stretch ratio in TD, (B) of a biaxially stretched film and a simultaneously post-stretched ratio in TD (B') are generally not less than about 4.0 (A·A'≧4; B·B'≧4.0), preferably not less than about 4.5 and more preferably not less than about 5.0. The most preferable product is one not less than 5.5 (A·A'≧5.5; B·B'≧5.5). It is preferable that the product of A by A' is substantially equal to the product of B by B'.

A biaxially high oriented film used for simultaneous stretching is made by applying the usual process of stretching in the usual order of MD-TD, or in order of TD-MD. The substantially amorphous film is stretched in one direction at a temperature preferably in the range of $T_g$ to $T_g+60°$ C., and more preferably $T_g+10°$ C. to $T_g+40°$ C. above 2.6 times its original dimensions, preferably within the range of 2.6 to 6.0 times its original dimensions, and more preferably 2.8 to 5.0 times its original dimensions; thereafter the film is stretched in a direction perpendicular to the direction of previous stretch above 2.6 times its original dimensions, preferably within the range of 2.6 to 6.0 times its original dimensions at a temperature preferably within $T_g$ to $T_g+80°$ C. and more preferably $T_g+10°$ C. to $T_g+60°$ C. A stretch process utilizing the stretch order of MD-TD is especially desirable in the present invention. In addition to the biaxially stretched film just mentioned, a film stretched biaxially in the order of MD-MD-TD, or in the order of MD-TD-MD can also be used. If the biaxially oriented film is preheat set between a temperature of simultaneous post-stretch ($T_s$) and $T_m-10°$ C., preferably between $T_s+5°$ C. and $T_s+30°$ C., prior to simultaneously post-stretching, a more effective orientation can be achieved.

For instance, a method using a tenter is recommended as a favorable simultaneous stretching process. When the tenter is used the film is grasped with many clips so it can be stretched transversely by changing the rail width and longitudinally by changing the distance between the clips. A film with edges, without edges or with folded edges is grasped between a wing and the base of a clip. Simultaneous stretching by a tubing method is not desirable.

A temperature of $T_s$ must be between $T_g + 10°$ C. and $T_m - 40°$ C. Beyond this temperature range, the film often breaks or a heterogeneous stretch situation results. The preferable temperature for simultaneous stretching is above the temperature previously mentioned for biaxially stretching $+10°$ C., in the range of $T_g + 40°$ C. to $T_m - 60°$ C. The preferable stretch ratio is within the range of 1.05 to 1.9 times its dimensions in MD and 1.0 to 1.9 times its dimensions in TD.

1.0 times its dimensions of stretch ratio in TD means to keep the film width constant while preventing transverse shrinkage or neckdown during stretch in MD. This allows the film to be substantially oriented. The preferable stretch ratio in TD is in the range of 1.05 to 1.9 times its dimensions. The simultaneous stretching ratio is arrived at by taking into consideration the state of orientation of a biaxially pre-stretched film; however, it should be noted that no orientation effect can be expected at a simultaneous stretching ratio under 1.05 times its dimensions, especially in MD. At more than 2.0 times its dimensions, the space between one clip and next one in MD is too wide; as a result, the film breaks, there is loss of film strength in TD, and there is quality variation because of neckdown in TD. The more preferable stretch ratio is between 1.25 and 1.7 times its dimensions.

The linear rate of stretch speed must be under 8,000 percent per minute. At a linear rate of stretch greater than 8,000 percent per minute, the film breaks. Therefore, the more preferable linear rate of stretch speed is under 5,000 percent per minute. The stretch ratio and the linear rate of stretch speed in MD and TD are not necessarily same. The can be selected properly only by taking film properties into consideration.

If a biaxially low oriented film is first stretched at under 2.6 times its original dimensions and then is simultaneously post-stretched, it cannot be transformed into a high tensilized film. In this case, film breaks occur frequently and stretchability is poor. It is because of this phenomenon that the process of the present invention, in which a biaxially high oriented film is simultaneously stretched under a low stretch ratio as the last stretch step, is useful.

As a heat setting process, a tenter method with clips is more preferably than a roll method. The film is heat set in the temperature range of $T_g + 50°$ C. to $T_m - 10°$ C., preferably over $T_s + 10°$ C. but between $T_g + 80°$ C. and $T_m - 20°$ C., under tension. If there is a need to improve dimensional stability, slight relaxation can be used.

The polyester film of the present invention has few of the defects found in ordinary films, e.g., creases in MD during roll winding. It has a good roll formation and shows not only high strength in MD but also high strength in TD. The film is especially suitable as a base film for long playing magnetic recording tape and capacitors having thicknesses of less than 10 μm.

The polyester constituting the polyester film of the present invention is polyethylene terephthalate, a copolyester consisting of at least 70 wt. % of polyethylene terephthalate and not more than 15 wt. % of another ester forming monomer, or a blend consisting of at least 70 wt. % of polyethylene terephthalate and not more than 15 wt. % of other polymers and/or additives, or polyethylene-2,6-naphthalate. The intrinsic viscosity is in the range of 0.5 to 1.0, preferably in the range of 0.55 to 0.9.

The invention will be illustrated further by the following examples. $T_g$ and $T_m$ were measured by the methods described below.

Glass transition temperature ($T_g$)

A substantially amorphous film was measured with a dilatometer at a heating rate of 5° C. per minute. $T_g$ is the temperature at the bending point of a specific volume vs. temperature curve.

Melting point ($T_m$)

A film was measured with a differential scanning calorimeter (DSC) at a heating rate of 10° C. per minute. $T_m$ is the temperature at the peak of the melting curve.

EXAMPLES 1–4, CONTROL EXAMPLE 1

A polyethylene terephthalate melt having an intrinsic viscosity of 0.70 was extruded onto a casting drum to form an amorphous film. This film was stretched in MD between upstream and downstream rolls, the downstream roll rotating at a speed in excess of the upstream roll so that the stretched length in MD was 3.5 times the unstretched longitudinal length. Following the longitudinal stretching step the film was transversely stretched to 3.5 times its dimensions by the tenter. After stretching in TD, the biaxially oriented film was simultaneously stretched by the tenter at a temperature of 150° C., at a linear rate of stretch speed of 3,000 percent per minute. Thereafter the film was heat set at 200° C. under tension. The thickness of the film was 6 μm. Test conditions and results are shown in Table 1. The strength of the film was high in both MD and TD. There were few film breaks during the stretching process and roll formation was good. Film breaks occurred frequently when the simultaneous stretching ratio was greater than 1.9 times the film's dimensions. The reason why the F-5 value is inclined to decrease with an increase in stretch ratio is because of relaxation of orientation in TD due to extension of space between one clip and the next one.

A magnetic layer consisting of γ-type ferric oxide and a binder was coated at a thickness of 3.5 μm to form a magnetic recording tape. The running property of magnetic tapes having width of ½ inch and length of 200 meters was measured by having it run on a video tape recorder (VTR). The properties of out-put and drop-out were also measured. The running property was evaluated from the beginning running state as well from changes of it made during testing. Tests were repeated 500 times.

⊙ excellent
o good
Δ medium
x poor

EXAMPLES 5–9, CONTROL EXAMPLES 2, 3

A polyethylene terephthalate film was prepared in accordance with the procedure described in Example 1 except that the stretch ratio of the biaxially pre-stretched film was 4.0 times its dimensions in MD and 4.2 times its dimensions in TD. The simultaneous stretching ratio is shown in Table 2. Film strength in MD and TD was high, few film breaks occurred and roll formation was good. The film of Control Example 2 corresponds to an ordinary biaxially stretched film.

EXAMPLES 10-14

A polyethylene terephthalate film was prepared in accordance with procedures described in Examples 5-9 except that the biaxially pre-stretched film was heat set under tension at 200° C. before simultaneous stretching. As shown in Table 3, stretchability did not diminish as a result of the heat setting. Instead, film properties were improved. The improved effect in TD is notable and seems to result from a prevention of film relaxation in TD during the simultaneous stretching process as a result of the heat setting.

EXAMPLES 15-16

A polyethylene terephthalate film was prepared in accordance with the procedure described in Example 1 except that the stretch ratio of the biaxially pre-stretched film was 3.0 times its dimensions in MD and 4.0 times its dimensions in TD. The simultaneous stretching ratio is shown in Table 4. The linear rate of stretch speed in Example 15 was 4,000 percent per minute in MD and 800 percent per minute in TD. In Example 16 the linear rate of stretch speed was 4,000 percent per minute in both MD and TD. Table 4 summarizes the excellent results achieved in these examples.

EXAMPLE 17, CONTROL EXAMPLE 4

A polyethylene terephthalate film was prepared in accordance with the procedure described in Example 1 except that the stretch ratio of the biaxially pre-stretched film was 3.0 times its dimensions in MD and 5.0 times its dimensions in TD. The simultaneous stretching ratio was 1.5 times its dimensions in MD and 1.0 times its dimensions in TD. In Control Example 4, a roll method was used as the post-stretch process instead of simultaneous stretching. The film was post-stretched in MD 1.5 times its dimensions at 150° C. and at a linear rate of speed of 50,000 percent per minute. The effect from the simultaneous stretching process is shown in Table 5.

EXAMPLE 18, 19, CONTROL EXAMPLE 5

A polyethylene terephthalate film was prepared in accordance with the procedure described in Example 1 except that in Example 18 an amorphous film was stretched 1.5 times its original dimensions in MD at a temperature of 120° C., then stretched 3.5 times its dimensions in MD-TD, respectively, and in Example 19 a biaxially pre-stretched film, pre-stretched at a stretch ratio of 3.0 times its dimensions in MD-TD, respectively, was post-stretched 1.5 times its dimensions in MD by using a roll method at a temperature of 150° C. at a linear rate of stretch speed of 50,000 percent per minute before simultaneous stretching. The simultaneous stretching ratio was 1.05 times its dimensions in MD and 1.5 times its dimensions in TD. In Control Example 5, the simultaneous stretching ratio was 1.0 times the film's dimensions in MD and 1.05 times its dimensions in TD. Test results are shown in Table 5.

CONTROL EXAMPLES 6-8

The substantially amorphous film in Example 1 was simultaneously stretched at a temperature of 85° C., at a linear rate of stretch speed of 3,000 percent per minute by using a tenter; thereafter said film was heat set under tension at a temperature of 200° C. The stretch ratio is shown in Table 6. If a high stretch ratio is adopted, the frequency of film breakage during the stretching process increased. If a comparatively low stretch ratio is selected to prevent film breakage during the stretch process, the film properties are inadequate.

CONTROL EXAMPLES 9-12

A polyethylene terephthalate film was prepared in accordance with the procedure described in Example 1 except: that in Control Example 9 a biaxially pre-stretched film was post-stretched 1.5 times its dimensions in MD at 150° C., at a linear rate of stretch speed of 50,000 percent per minute by using a roll method instead of the simultaneous stretching; in Control Example 10, a substantially amorphous film was stretched 2.5 times its dimensions in MD at a temperature of 82° C. and 1.2 times its dimensions in TD at a temperature of 120° C., then simultaneously stretched 2.0 times its dimensions in MD and TD at a temperature of 100° C.; in Control Example 11, a substantially amorphous film was stretched in TD only at a temperature of 90° C., at a linear rate of stretch speed of 1,300 percent per minute, then simultaneously stretched 4.0 times its dimensions in MD and 1.2 times its dimensions in TD at a temperature of 110° C.; and in Control Example 12, a substantially amorphous film was simultaneously stretched 3.5 times its dimensions in MD and TD at a temperature of 85° C. at a linear rate of stretch speed of 3,000 percent per minute, thereafter post-stretched 1.5 times its dimensions in MD at a temperature of 150° C. at a linear rate of stretch speed of 50,000 percent per minute by using a roll method instead of simultaneous stretching. As shown in Table 6, every film has low film strength and poor roll formation. Through the total stretch ratios in Example 1 and in Control Example 7 are nearly comparable, the film strength in Example 1 is higher than that in Control Example 7. This data shows the effectiveness of simultaneous post-stretching of a biaxially pre-stretched film in order to achieve high strength. Similarly, the stretchability and the F-5 value in Example 6 are superior to ones in Control Example 8.

In Control Example 13 a substantially amorphous film was stretched 2.0 times its dimensions in MD at a temperature of 82° C. and 2.0 times its dimensions in TD at a temperature 120° C., then simultaneously stretched 2.5 times its dimensions in MD and TD at a temperature of 130° C. This example shows that even if a low biaxially oriented film is simultaneously stretched at high stretch ratio, film properties such as stretchability and roll formation are poorer than they would be for a film that is simultaneously stretched at a comparatively low stretch ratio after being biaxially stretched at a high stretch ratio.

TABLE 1

|  | Stretch ratio of simultaneously stretching (in MD and TD, respectively) | F-5 value (kg/mm$^2$) MD | F-5 value (kg/mm$^2$) TD | Frequency of film break (per 9,000 m) | Roll formation property | Running property |
|---|---|---|---|---|---|---|
| Example 1 | 1.3 | 15.6 | 15.2 | 0 | ◯ | ◯ |
| 2 | 1.5 | 18.0 | 18.3 | 0 | ◯ | ◎ |
| 3 | 1.7 | 20.3 | 19.2 | 0 | ◯ | ◎ |
| 4 | 1.9 | 23.7 | 18.5 | 1 | ◯ | ◎ |
| Control Example 1 | 2.0 | 24.0 | 17.0 | 13 | (break) | ◎ |

TABLE 2

|  | Stretch ratio of simultaneously stretching (in MD and TD, respectively) | F-5 value (kg/mm$^2$) MD | F-5 value (kg/mm$^2$) TD | Frequency of film break (per 9,000 m) | Roll formation property |
|---|---|---|---|---|---|
| Control Example 2 | 1.0 | 11.8 | 12.0 | 0 | △ |
| Example 5 | 1.05 | 14.0 | 14.6 | 0 | ◯ |
| 6 | 1.25 | 15.6 | 16.8 | 0 | ◯ |
| 7 | 1.5 | 18.9 | 19.0 | 0 | ◯ |
| 8 | 1.7 | 22.0 | 20.1 | 0 | ◯ |
| 9 | 1.9 | 25.3 | 19.3 | 2 | ◯ |
| Control Example 3 | 2.0 | 26.0 | 18.0 | 21 | (break) |

TABLE 3

|  | Stretch ratio of simultaneously stretching (in MD and TD, respectively) | F-5 value (kg/mm$^2$) MD | F-5 value (kg/mm$^2$) TD | Frequency of film break (per 9,000 m) | Roll formation property |
|---|---|---|---|---|---|
| Ex. 10 | 1.05 | 14.8 | 15.0 | 0 | ◯ |
| 11 | 1.25 | 16.5 | 17.0 | 0 | ◯ |
| 12 | 1.5 | 20.1 | 20.5 | 0 | ◯ |
| 13 | 1.7 | 24.0 | 23.5 | 0 | ◯ |
| 14 | 1.9 | 26.0 | 23.0 | 3 | ◯ |

TABLE 4

|  | Stretch ratio of simultaneous stretching MD | Stretch ratio of simultaneous stretching TD | F-5 value (kg/mm$^2$) MD | F-5 value (kg/mm$^2$) TD | Frequency of film break per 9,000 m | Roll formation property |
|---|---|---|---|---|---|---|
| Ex. 15 | 1.5 | 1.1 | 16.0 | 14.3 | 0 | ◯ |
| 16 | 1.5 | 1.5 | 15.9 | 20.1 | 0 | ◯ |

TABLE 5

|  |  |  | F-5 value (kg/mm$^2$) MD | F-5 value (kg/mm$^2$) TD | Frequency of film break (per 9,000 m) | Roll formation property |
|---|---|---|---|---|---|---|
| Example | 17 | MD-TD-simultaneous (1.5 × 1.0) | 16.0 | 16.0 | 0 | ◯ |
| Control Example | 4 | MD-TD-MD | 16.9 | 10.9 | 0 | △ |
| Example | 18 | MD-MD-TD-simultaneous | 16.5 | 15.8 | 0 | ◯ |
| Example | 19 | MD-TD-MD-simultaneous (1.05 × 1.5) | 16.0 | 15.9 | 0 | ◯ |
| Control Example | 5 | MD-TD-MD-simultaneous (1.0 × 1.5) | 13.0 | 15.6 | 0 | ◯ |

TABLE 6

|  |  | Stretching process |  | F-5 value (kg/mm$^2$) MD | F-5 value (kg/mm$^2$) TD | Frequency of film break (per 9,000 m) | Roll formation property | Running property |
|---|---|---|---|---|---|---|---|---|
| Control | 6 | simultaneous | (4.0 × 4.0) | 11.8 | 12.0 | 0 | △ | X |
| Example | 7 | simultaneous | (4.5 × 4.5) | 12.5 | 12.9 | 1 | △ | X |
|  | 8 | simultaneous | (5.0 × 5.0) | 13.8 | 13.9 | 11 | (break) | — |
| Control | 9 | MD-TD-MD | | 18.0 | 9.8 | 0 | △ | X |
| Example |  | (3.5-3.5-1.5) | | 18.0 | 9.8 | | △ | |
| Control | 10 | MD-TD-simultaneous | | | | | | |
| Example |  | (2.5-1.2-2.0 × 2.0) | | 18.3 | 10.2 | 0 | △ | X |
| Control | 11 | TD-simultaneous | | | | | | |
| Example |  | 2.5-4.0 × 1.2) | | 15.1 | 10.5 | 0 | △ | X |
| Control | 12 | simultaneous-MD | | | | | | |
| Example |  | (3.5 × 3.5-1.5) | | 18.5 | 9.9 | 0 | △ | X |
| Control | 13 | MD-TD-simultaneous | | | | | | |
| Example |  | (2.0-2.0-2.5 × 2.5) | | 12.1 | 11.0 | 8 | △ | X |

We claim:

1. In a process for preparing highly tensilized polyester film having F-5 values over 14 kg/mm$^2$ in both MD and TD, the steps which comprises stretching a polyester film to an extent of at least 2.6 times its dimensions in MD and TD, simultaneously stretching the resulting film in the range of 1.05 to 1.9 times its dimensions in MD and 1.0 to 1.9 times its dimensions in TD at a linear rate of stretch speed under 8,000 percent per minute at a temperature between $T_g+10°$ C. and $T_m-40°$ C., and heat setting said film at a temperature between $T_g+50°$ C. and $T_m-10°$ C.

2. A process as defined in claim 1, wherein said linear rate of stretch speed in said simultaneous stretching step is under 5,000 percent per minute.

3. A process as defined in claim 1, wherein the stretch ratio and the linear rate of stretch speed in MD and TD are substantially the same.

4. A process as defined in claim 1, wherein the stretch ratio and the linear rate of stretch speed in MD and TD are substantially different.

5. A process as defined in claim 1, wherein said polyester film is selected from the group consisting of a polyethylene terephthalate copolyester consisting of at least 70 wt. % of polyethylene terephthalate and up to 15 wt. % of another ester forming monomer, and blends consisting of at least 70 wt. % of polyethylene terephthalate and up to 15 wt. % of other polymers and/or additives, or polyethylene-2,6-naphathalate.

6. A process as defined in claim 1, wherein said polyester film has an intrinsic viscosity in the range of 0.5 to 1.0.

7. A process as defined in claim 1, wherein said polyester film has an intrinsic viscosity in the range of 0.55 to 0.9.

8. A process as defined in claim 1, wherein the simultaneous stretching is performed by pulling the film in the machine direction and by simultaneously grasping the edges of said film at a multiplicity of spaced-apart locations arranged along opposite edges of said film and pulling said film in the transverse direction at said grasping locations.

9. A process as defined in claim 8, wherein said simultaneous stretching comprises a tentor stretching step.

10. A process as defined in claim 1, wherein the MD stretch ratio of said film prior to simultaneous post-stretching, multiplied by the post-stretch ratio in MD is substantially equal to the TD stretch ratio of said film prior to simultaneous post-stretching multiplied by the post-stretch ratio in TD.

11. A process as defined in claim 8, wherein the product of such ratio multiplication is greater than about 4.0.

12. A process as defined in claim 8, wherein the product of such ratio multiplication is greater than about 4.5.

13. A process as defined in claim 8, wherein the product of such ratio multiplication is greater than about 5.0.

14. A process as defined in claim 8, wherein the product of such ratio multiplication is greater than about 5.5.

15. A process as defined in claim 1, wherein said stretching of at least 2.6 times of a biaxially high oriented film used for simultaneous stretching was conducted at a temperature in the range of $T_g$ to $T_g+60°$ C.

16. A process as defined in claim 1, wherein said stretching of at least 2.6 times of a biaxially high oriented film used for simultaneous stretching was conducted at a temperature in the range of $T_g+10°$ C. to $T_g+40°$ C.

17. A process as defined in claim 13, wherein said stretching of a biaxially high oriented film used for simultaneous stretching is conducted within the range of 2.6 to 6.0 times the film's original dimensions.

18. A process as defined in claim 13, wherein said stretching of a biaxially high oriented film used for simultaneous stretching is conducted within the range of 2.8 to 5.0 times the film's original dimensions.

19. A process as defined in claim 13, wherein the film is subsequently stretched in a different direction at a temperature in the range of $T_g$ to $T_g+80°$ C.

20. A process as defined in claim 13, wherein the film is subsequently stretched in a different direction at a temperature in the range of $T_g$ to $T_g+60°$ C.

21. A process as defined in claim 1 wherein the biaxially oriented film is pre-heat set at a temperature between the temperature of the simultaneous post-stretch ($T_s$) and $T_m-10°$ C.

22. A process as defined in claim 1 wherein the biaxially oriented film is pre-heat set at a temperature between $T_s+5°$ C. and $T_s+30°$ C.

23. A process as defined in claim 1 wherein the temperature for simultaneous post-stretching is 10° C. above the temperature used for biaxially stretching.

24. A process as defined in claim 1 wherein the temperature for simultaneous post-stretching is within the range of $T_g+40°$ C. to $T_m-60°$ C.

25. A process as defined in claim 1 wherein the simultaneously post-stretched film is heat set in the temperature range of $T_g+80°$ C. and $T_m-20°$ C., under tension.

26. A process as defined in claim 25, wherein the film is subjected to relaxation while heat setting.

* * * * *